United States Patent [19]

Harase et al.

[11] Patent Number: 4,829,383
[45] Date of Patent: May 9, 1989

[54] CAMERA FOR SHOOTING MOVIE AND STILL PICTURE

[75] Inventors: Toshikatsu Harase; Akira Masuda, both of Tokyo, Japan

[73] Assignees: Fuji Photo Film Co., Ltd., Kanagawa; Sony Corporation, Tokyo, both of Japan

[21] Appl. No.: 176,778

[22] Filed: Apr. 1, 1988

[30] Foreign Application Priority Data

Apr. 20, 1987 [JP] Japan .................. 62-95040

[51] Int. Cl.⁴ .................. H04N 5/30; H04N 5/225
[52] U.S. Cl. .................. 358/229; 358/209; 354/76
[58] Field of Search .................. 358/229, 209, 225, 76, 358/909, 906; 354/75, 76

[56] References Cited

U.S. PATENT DOCUMENTS 3,891,795  6/1975  Johnson et al. .................. 358/225
4,714,962 12/1987  Levine .................. 358/209
4,716,470 12/1987  Levine .................. 358/229

Primary Examiner—Jin F. Ng
Assistant Examiner—Stephen Brinich
Attorney, Agent, or Firm—Birch, Stewart, Kolasch & Birch

[57] ABSTRACT

A camera including a casing in which a video camera unit for shooting a movie picture and a still camera unit for shooting a still picture are disposed, thereby enabling movie and still pictures to be shot at the same time. A housing to contain the still camera unit is rotable with respect to the casing, which exposes an opening of the housing to load a film by a drop-in loading. Since the housing containing the still camera unit rotates toward the front side of the casing, it is not necessary to reserve a space for a backward movement of the cap member of the still camera unit, which enables the camera to be designed in compact.

5 Claims, 7 Drawing Sheets

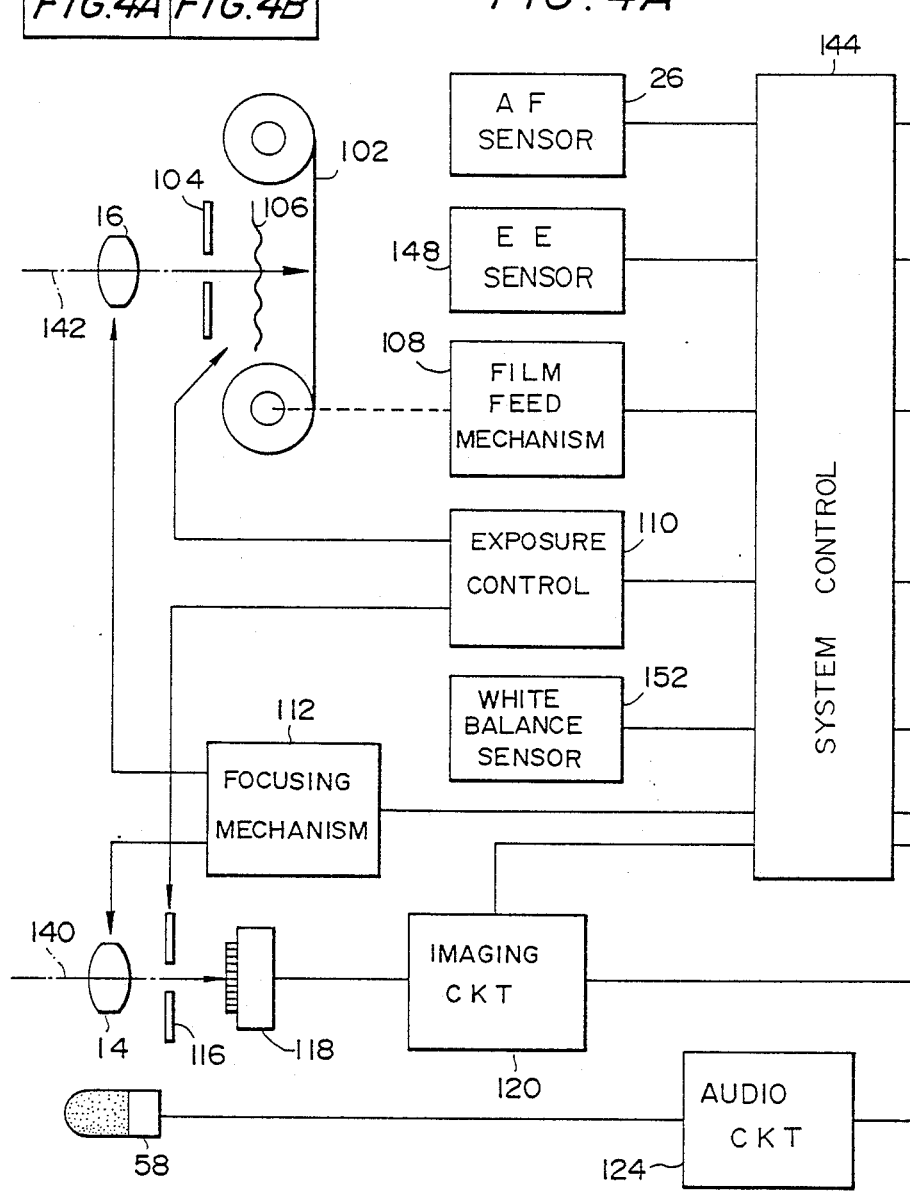

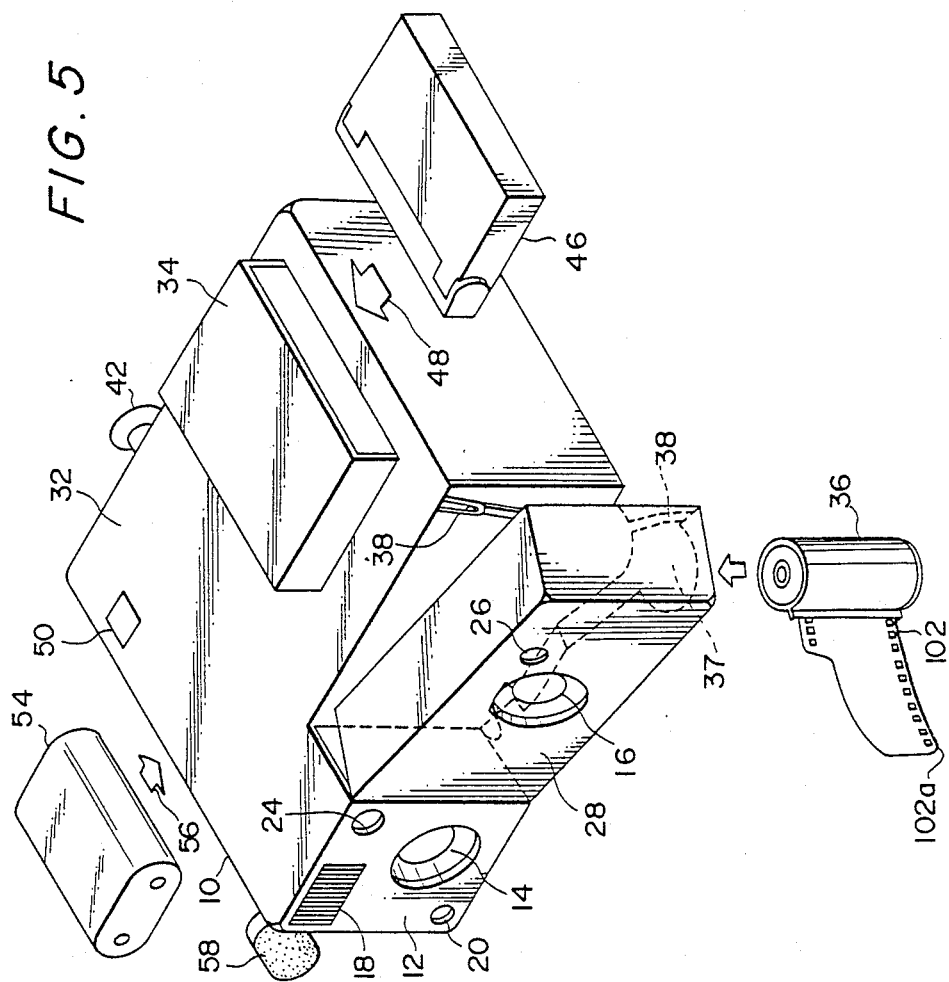

CAMERA FOR SHOOTING MOVIE AND STILL PICTURE

BACKGROUND OF THE INVENTION

1. Field of the Invention

The present invention relates to a camera for shooting a movie picture and a still picture, and in particular, to a movie video camera configured in a unit together with a still camera using a silver-halide type of photographic film.

2. Description of the Prior Act

There has been a requirement to record a particular scene in the form of a still picture during a shooting operation of a television camera having a function to record a movie picture on a video tape, so called video camera.

Conventionally, a still camera using a silver-halide film and a separate video camera using a video tape are carried about in such a case where when a scene suitable for a still picture appears during a shooting of the video camera, the operation of the video camera is interrupted to take the still picture by use of the still camera. In this situation, two units have to be used and in the shooting of the still camera, the operation of the video camera is required to be interrupted, which leads to a disadvantage that an important shooting chance may be lost.

To solve the problem above, there is desired a camera for shooting a movie picture and a still picture configured in a single unit including a combination of a still camera and a video camera such that a still picture can be taken through an operation of the still camera without interrupting the shooting operation of the video camera.

Such a camera, with consideration to portability thereof, is desired to be configured such that when a unit shooting a still picture and a unit to take a video picture are combined, the overall contour thereof is smooth in the surfaces thereof as compared with an ordinary camera and that operating or handling means of the still camera unit and the video camera unit can be appropriately and readily manipulated by two hands or by a single hand.

Furthermore, the still camera unit is provided with an opening through which a film is loaded, namely, a cartridge (Patrone) loaded with a film is installed through the opening into the still camera unit, which advantageously enables a so-called drop-in loading of a film in effect. Consequently, the still camera unit has an opening for the film loading formed in an upper surface or a bottom surface thereof, and after a film is loaded, a cap member covers the opening; whereas in a film loading operation, the cap member is removed from the opening so as to effect a drop-in loading of the film cartridge. As a consequence, a camera in which a still camera unit and a video camera unit are integrally combined with each other has to be designed such that the cap member of the still camera unit can be opened to the backward direction thereof with a space reserved for the cap opening operation, which leads to a problem that the size of the camera cannot be minimized.

SUMMARY OF THE INVENTION

It is therefore an object of the present invention to provide a camera for shooting a movie picture and a still picture which has the satisfactory portability and operability to enable a drop-in loading of a film, thereby solving the problem of the prior art technology.

According to the present invention, there is provided a camera for shooting a movie picture and a still picture comprising a casing having generally a substantially rectangular parallelepiped shape, a first imaging optical system for a still image and a second imaging optical system for shooting a video picture each disposed at a location in front of the casing so as to being directed to an object scene, a still camera unit arranged in the casing so as to be located in the neighborhood of the first imaging optical system for shooting the object scene so as to record a still picture thereof on a film, and a video camera unit disposed in the casing for shooting the object scene so as to record a movie picture thereof on a video tape. The first imaging optical system and the still camera unit are contained in a cabinet for the still camera unit constituting a portion of the casing. The cabinet for the still camera unit is provided, in either of an upper surface and a bottom surface of said cabinet to load therein a film through a drop-in loading operation and a cap member covering the opening, the cap member being fixedly arranged in the casing. The cabinet of the still camera unit is linked at a portion thereof with the casing such that the cabinet excepting the cap member is configured to be rotable with respect to the casing. When the cabinet of the still camera unit is rotated, the opening of the camera is exposed, thereby enabling a film to be installed therein.

Incidentally, the term "a camera for shooting a movie picture and a still picture" in this specification is to be broadly interpreted as an imaging appartus having both a function of still camera and a function of a video camera regardless of whether or not the still camera unit and the video camera unit are incorporated into a housing, whether or not the still and video camera units are respectively contained in independent cabinets, whether or not the still and video camera units are separable when both of the units are respectively contained in independent cabinets, and whether or not the still and video camera units can be independently used when both units are separable.

BRIEF DESCRIPTION OF THE DRAWINGS

The objects and features of the present invention will become more apparent from the consideration of the following detailed description taken in conjunction with the accompanying drawings in which:

FIGS. 4A-4B, when combined as shown in FIG. 4, are functional block diagrams schematically illustrating internal configuration examples of the camera of FIG. 1;

FIG. 5 is an outer perspective view useful to explain a state where films are loaded in an alternative embodiment of a camera for shooting a movie picture and a still picture according to the present invention.

DESCRIPTION OF THE PREFERRED EMBODIMENTS

Referring now to the accompanying drawings, description will be given of embodiments of a camera for shooting a movie picture and a still picture according to the present invention.

Figure 1:
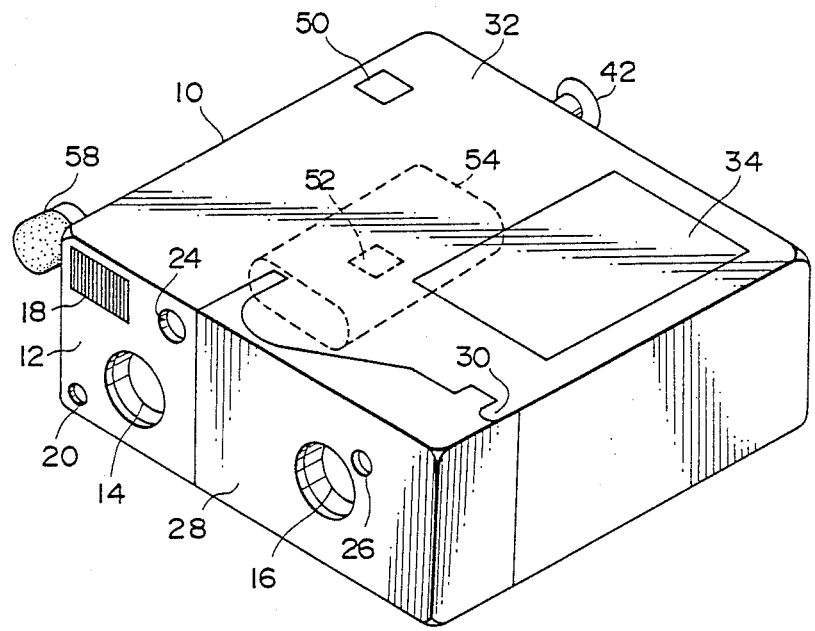
FIG. 1 is a perspective view of an appearance of an embodiment of a camera for shooting a movie picture and a still picture according to the present invention.

FIG. 1 shows an embodiment in which the present invention is applied to a camera integrated with an so-called 8-millimeter (mm) video camera. Basically, the camera includes a casing 10 having generally a shape of a substantially rectangular parallelepiped, and the casing contains a unit having a function of a still video camera and a unit having a function of a still camera. The video camera unit uses as a video recording medium a video tape 100, FIG. 4B, having a tape width of 8 millimeters (mm) so as to function as a movie video camera unit which shoots an object scene so as to record a movie picture thereof in the form of a video signal on the video tape 100 together with a sound. The still camera unit in the embodiment is a still camera of the 135 type using a 35 mm silver-halide type of photographic film 102 as a image recording medium and functions as a still camera unit which records a still picture of an object scene in the form of a latent image on the silver-halide photographic film 102.

The casing 10 has a front surface 12 with a substantially rectangular shape in which two imaging lenses 14 and 16 are disposed. The one imaging lens 14 constitutes an imaging optical system of the video camera unit, whereas the other imaging lens 16 configures an imaging optical system of the still camera unit. In the proximity of the imaging lens 14 of the video camera unit, there are arranged, as shown in the figures, a strobe light emitting device 18, a light emitting device 20 for an automatic distance measurement or for an auto focusing (AF), and an objective lens 24 of an optical viewer 22, FIG. 3, to shoot a still picture. The optical viewer 22 has an eye cup where an eye is to be aligned is located in a rear surface of the casing 10. These two imaging lenses 14 and 16 are disposed to face the same object scene and this is also the case of the objective lens 24 of the optical viewer 22, which enables the still camera unit and the video camera unit in this system to shoot the same object scene. It is to be understood that an electronic view finder may be used in place of the optical viewer.

On a side of the casing, namely, on the left-hand side of this embodiment in FIG. 1, there is disposed a microphone 58 to catch a voice and a sound from the object field. A microphone having a directivity associated with a single direction is advantageously employed for the microphone 58.

In the vicinity of the imaging lens 16 of the still camera unit, there is arranged a light receiving sensor 26 for an automatic distance measurement as shown in the figures. In the casing 10, a portion thereof including the front surface 12 forms an independent housing 28. In the housing 28, there are disposed an imaging optical system of the still camera unit including an imaging lens 16, an iris 104, and an optical shutter 106, FIG. 4A, as well as various mechanisms necessary for the operation of the still camera such as an AF sensor 26, a film feed mechanism 108, and a portion of a focusing mechanism 112, FIG. 4A. These elements enable an object image thus shot to be recorded on a film 102.

Figure 2:
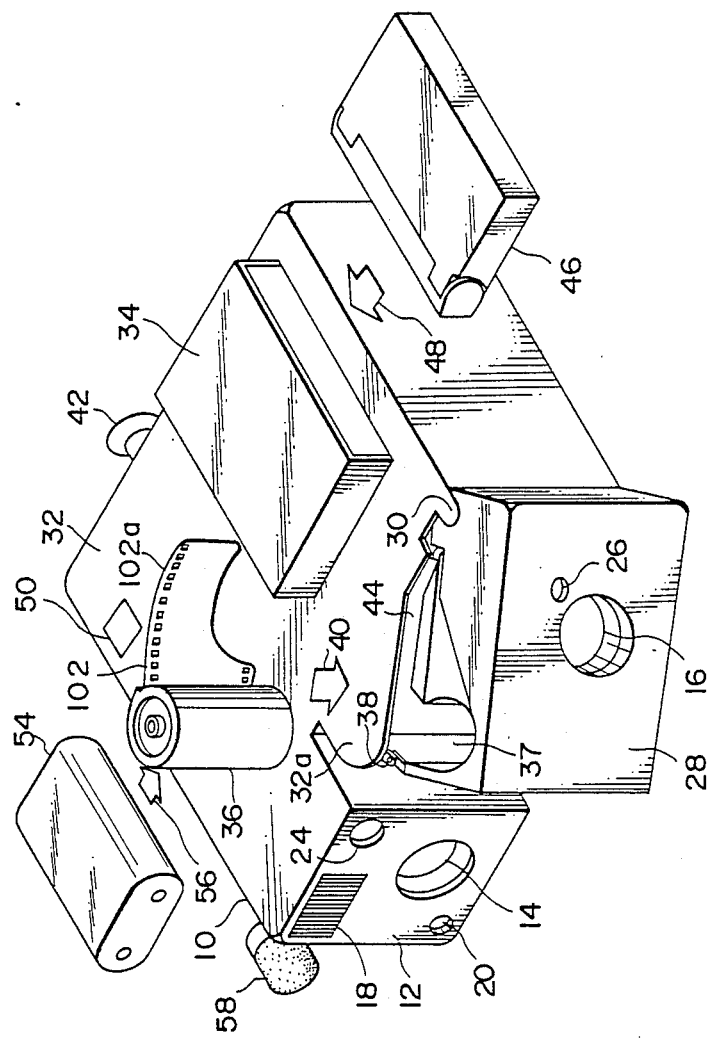
FIG. 2 is a perspective view of an appearance of the camera of FIG. 1 illustrating a state where films are installed.

As can be seen from FIG. 2, the housing 28 can be opened toward the front direction by a slight angle about a hinge 30 as a pivotal axis. That is, the housing 28 is linked with a right end thereof in this figure to the casing 10 so as to be rotated such that the left end thereof is apart from the casing 10. The housing 28 is rotated toward the front side by an angle restricted by the movable arm 38, which forms an opening for a drop-in loading of a film 102.

The drop-in loading is described for example in the Japanese Patent Laid-Open No. 68731/1983. According to the camera of the present invention, in a state where the housing 28 is opened to a position of FIG. 2, as indicated by an arrow 40, a film cartridge 36 is installed downward in a cartridge chamber 37, and at the same time, a leader 102a of the film 102 of the 135 type drawn from the film cartridge 36 by a slight length is inserted downward into a gap 44 formed between a cap member 32a secured on an upper surface of the casing 10 and a rear section of the housing 28, thereby installing the film cartridge 36 in the cartridge chamber 37; thereafter, the housing 28 is restored to a closed position so as to easily complete the drop-in loading of the film.

On the upper surface 32 having a generally rectangular shape of the casing 10, there is disposed an open section as a cassette loading section 34. For the cassette loading section 34, when the operator depresses a switch button located in an operation display section 114, FIG. 4B, to mount/detach an 8 mm video tape cassette 46, namely, an eject button to indicate an automatic loading operation of the cassette 46, the cassette loading section 34 moves upward/downward so as to form an opening to load the cassette 46. As shown in FIG. 2, when the cassette loading section 34 moves upward, the 8 mm video tape cassette 46 can be installed in or removed from the loader section 34. The cassette 46 is inserted in a direction denoted by an arrow 48 and then the cassette loader 34 is moved downward to the original position, thereby detachably mounting the cassette 46 therein.

Furthermore, on the upper surface 32 of the casing 10, there is arranged a shutter release button 50 of the still camera unit as shown in the figure, whereas on the bottom surface of the casing 10, there is disposed a record button 52 of the video camera unit. The user holds the apparatus by fingers of both hands on the upper surface 32 and the bottom surface of the casing 10, and in this situation, the shutter release button 50 or the record button 52 can be pushed by the first finger of the right hand or by the thumb thereof, respectively.

In FIG. 1, at a position of the casing 10 indicated by a dotted line 54, there is detachably installed a power source, for example, a secondary battery of this apparatus. When a cover of a battery mount section located in a side wall of the casing 10 is opened, the battery can be mounted therein from a direction denoted by an arrow 56 of FIG. 2.

Figure 4B:
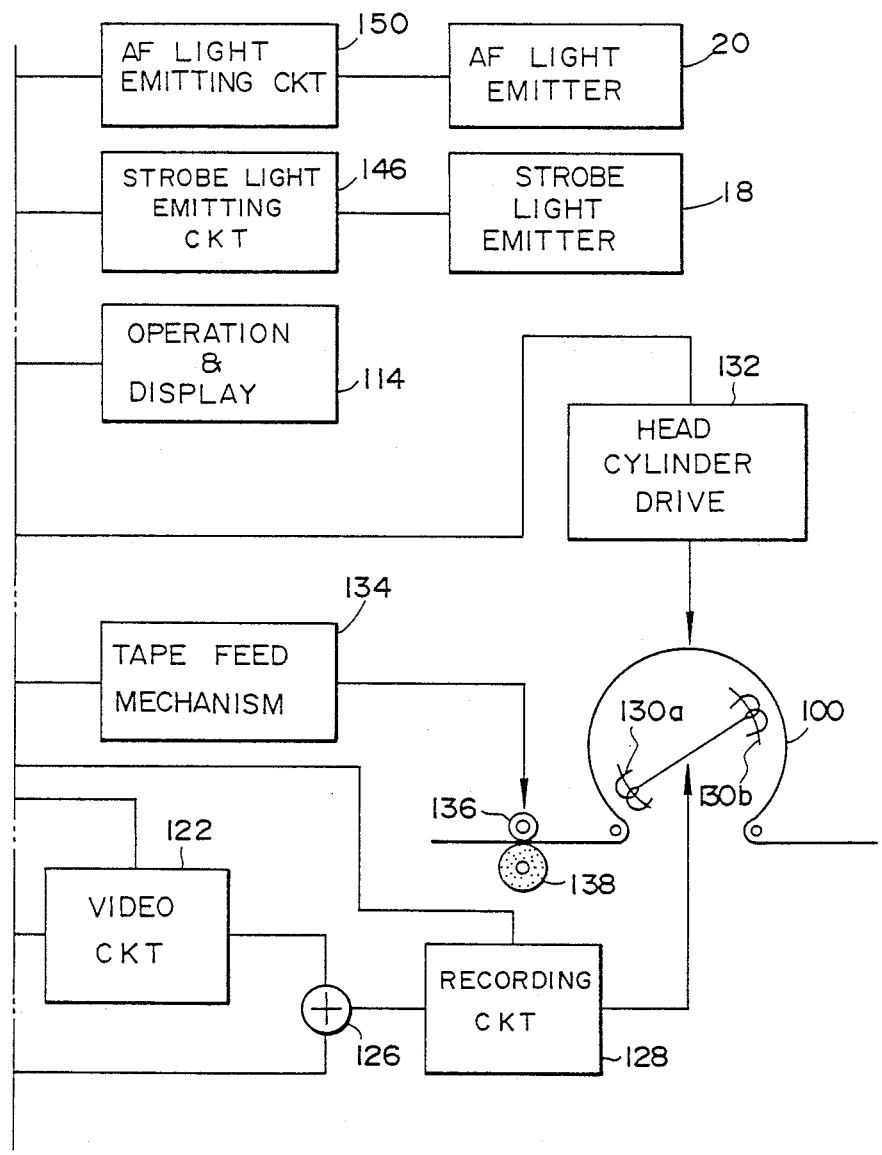

Referring now to FIGS. 4A-4B, there is shown an example of a circuit constitution of the camera of FIG. 1. The imaging optical system of the video unit includes an imaging lens 14 and a solid-state imaging device 118 such as a charge-coupled device (CCD) transducing an optical image of an object obtained through an iris 116 and an imaging lens 14 from an optical signal into a video signal, these elements being located in a light path 140 of the incident light from the object.

Although the imaging lens 14 may be of a fixed-focus type, the focus position of this embodiment is controlled by an automatic focusing (AF) mechanism 112 in response to a distance measurement signal supplied from a system control circuit 144. For the iris 116, an automatic exposure adjust (EE) function is advantageously employed, namely, an appropriate exposure is attained by means of an exposure adjust circuit 110 in response to a distance measurement signal received from the system control circuit 144. The imaging device 118 is driven by an imaging circuit 120, and a video signal generated from the imaging device 118 is supplied via the imaging circuit 120 to a video circuit 122.

The imaging circuit 120 clocks the imaging device 118, a video signal outputted therefrom is amplified, and the resultant signal undergoes necessary corrections such as an adjustment of a white balance, thereby generating a composite video signal in the standard color television format including a luminance signal, a color difference signal, and synchronizing signal. The obtained composite video signal is delivered to the video circuit 122 so as to undergo various processing such as a preemphasis emphasizing a high-frequency component, a clamping to attain a predetermined signal level, and a frequency modulation transforming the signal into a recording signal suitable for recording on a video tape 100, thereby supplying resultant signal to a mixer 126.

On the other hand, a sound caught by the microphone 58 is converted by the audio circuit 124 into an audio signal, which is further subjected to processing such as an amplification, an automatic gain adjustment, a frequency modulation transforming an obtained signal into a recording signal suitable for the recording thereof on the video tape 100, thereby supplying a resultant signal to the mixer 126.

Figure 3:
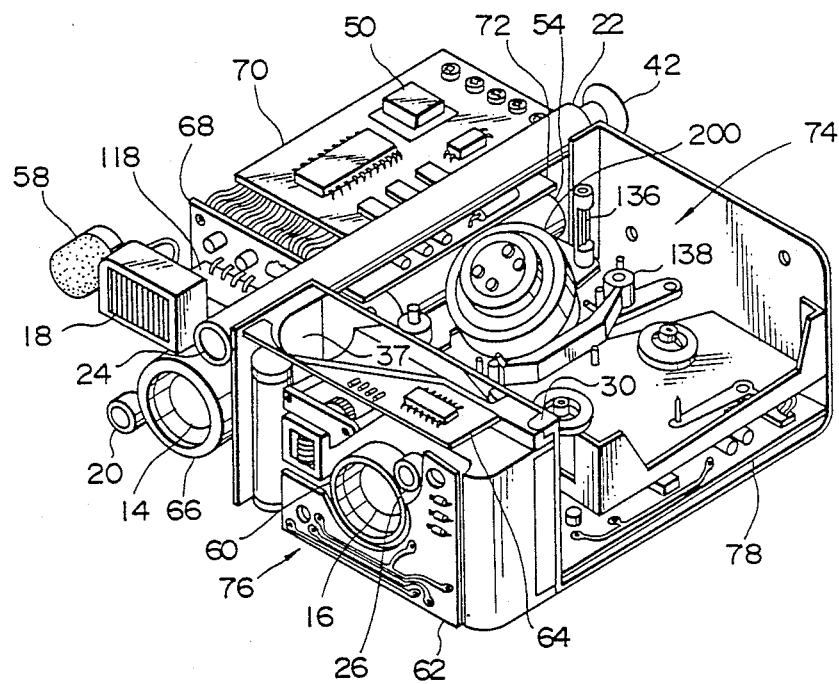
FIG.3 is a perspective view schematically showing an internal structure of the camera of FIG. 1.

The recording signals associated with the composite video signal and the audio signal are mixed in the mixer 126 and is then amplified in a recording circuit 128 so as to be fed to a set of magnetic heads 130a–130b, which are secured on a head cylinder 200, FIG. 3, to have the different azimuth angles and are rotated at a predetermined constant rotary speed by a head cylinder drive mechanism 132. The video tape 100 is held between a capstan 136 driven by the tape feed circuit 134 and a pinch roller 138 so as to be fed in a predetermined direction. Through these operations, the composite video signal and the audio signal supplied to the magnetic heads 130a–130b are recorded on the video tape 100.

The optical system of the still camera unit includes an imaging lens 16 followed by an iris 104, an optical shutter 106, and a film 102, those components being arranged in a light path 142 of the incident light from the object. Although the imaging lens 16 may be of a fixed-focus type, the focus position of this apparatus is designed to be controlled by means of the focusing mechanism 112. For the iris 104 and the optical shutter 106, there is advantageously employed an automatic exposure adjust function by use of the exposure control circuit 110.

The film 102 is automatically loaded, wound on, and wound back by means of the film feed mechanism 108 in response to an instruction signal supplied from the system control circuit 144.

The system control circuit 144 controls various sections of this apparatus, for example, effects a control on the tape feed circuit 134 in response to an operation of the record button 52 in the operation and display section 114, thereby controlling an operation to feed the video tape 100. Furthermore, for example, the system control circuit 144 controls the exposure control circuit 110, the focusing mechanism 112, and the strobe light emitting circuit 146 in response to an operation of the shutter release button 50.

The apparatus of the embodiment is provided with an automatic exposure (EE) sensor 148, which measures the brightness of the object scene so as to supply the system control circuit 144 with data indicating the measured value of the brightness. The system control circuit 144 controls the exposure control circuit 110 and the strobe light emitting circuit 146 depending on the brightness data of the object scene supplied from the EE sensor 148. In response thereto, the exposure control circuit 110 adjusts the opening of the iris 104 of the still camera unit and at the same time controls the exposure period of time for which the shutter 106 is to be kept opened. Furthermore, the strobe light emitting circuit 146 controls the period of time of the light emission effected by the stroboscopic light emitter 18.

The auto focusing (AF) light emitting element 20 is connected via the AF light emitting circuit 150 to the system control circuit 144. In response to an instruction from the system control circuit 144, the AF light emitting circuit 150 drives the AF light emitter element 20 to radiate, for example, an infrared light to an object; and then a portion of the infrared radiation reflected from the object is sense by the AF sensor 26 so as to accomplish an automatic measurement of the distance between the apparatus and the object. The measured data of the distance is delivered from the AF sensor 26 to the system control circuit 144.

The distance is measured according to the principle of the trigonometrical survey; in the apparatus, however, as can be seen from FIG. 1, since the distance or the base line between the AF light emitting element 20 and the AF sensor 26 is sufficiently long, an appropriate distance measurement can be accomplished. Depending on data of the distance between the apparatus and the object supplied from the AF sensor 26, the system control circuit 144 controls the focusing mechanism 112 to adjust the foci of the two imaging lenses 14 and 16, respectively.

Furthermore, this apparatus is provided with a white balance sensor 152, which is sensitive to color components of an incident light from the object so as to deliver data of the color components to the system control circuit 144. Based on the data, the system control circuit 144 sets parameters to a white balance adjust circuit in the imaging circuit 120.

The operation and display section 144 is a functional unit which supplies this apparatus with an instruction manually entered and which visibly or audibly indicates a state of the apparatus to the operator. The operator's console 114 therefore comprises various operation buttons such as a shutter release button 50, a record button 52, a button to switch between an automatic operation and a manual operation for the adjustment of the focus, the exposure, and the white balance; buttons to set a fader, a wiper, and a title insertion; operation buttons to set the recording, rewinding, and review operations of video tape recording mechanism 74, FIG. 3; a strobe setting button of the still camera unit, and indicators such as for the operation mode display, the tape counter, the tape end alarm, the film counter, and the power level warning indicator.

Referring now to FIG. 3, there is schematically shown an internal configuration of the apparatus with the casing 10 removed in the state of FIG. 1. The housing 28 of the casing 10 primarily includes therein a still camera unit 76. For example, there are arranged, as shown in the figure, a lens unit 60 in which an imaging optical system including an imaging lens 16 of the still camera unit 76 and the AF sensor 26 are incorporated, and electronic circuit boards 62 and 64 on which such components associated with functions to shoot a still picture as an exposure control circuit 110, a focusing mechanism 112, an automatic light measurement and distance measurement circuit are mounted, an AF light emitting circuit 150, and a stroboscopic light emitter circuit 146.

Following an imaging optical system unit 66 including the imaging lens 14 of the video camera unit, there is disposed, as shown in the figure, a solid-state imaging device 118 mounted on the electronic circuit board 68; furthermore, components associatad with functions to shoot a movie picture are also mounted thereof such as an exposure control circuit 110, a focusing mechanism 112, and an automatic light measurement and distance measurement circuit. On the rear side thereof, there are arranged electronic circuit boards 70 and 72 including a video circuit 120 and a audio circuit 124, and a battery 54 is disposed therebelow.

As shown in FIG. 3, a video tape recording mechanism 74 comprising a video tape cassette loading section 34, a magnetic head cylinder 200, a capstan 136, and a pinch roller 138 is disposed on a back side of the still camera unit 76, and below the video tape recording mechanism, there are arranged a head cylinder drive mechanism 132 including a cylinder motor and the like and an electronic circuit board 78 mounting thereon mixer 126, recording circuit 128, tape feed circuit 134, and system control circuit 144. An optical view finder 22 is, as shown in this diagram, located between the electronic circuit board 70 and the video tape recording mechanism 74.

According to the embodiment of the present invention, as described above, the imaging lenses 14 and 16 are disposed in the front surface 12 of the casing 10 and the still camera unit 76 is located in the proximity of the imaging lens 16 of the still camera unit; whereas circuits and mechanisms necessary to shoot a movie picture are arranged on the rear side of the imaging lens 14 of the video camera unit, and the video tape recording mechanism and circuits associated therewith are disposed on the back side of the still camera unit 76. Consequently, the operation to shoot a movie picture by the video camera unit and the operation to take a still picture by the still camera unit can be simultaneously effected without causing any interferences therebetween.

Moreover, the operation to load and unload the video tape cassette 46 and the drop-in loading of the film 102 can be accomplished through the upper surface 32 of the casing 10. Particularly, since the drop-in loading of the film 102 is achieved by turning the housing 28 of the still camera unit with respect to the casing 10 so as to expose the opening of the cartridge chamber 37, it is unnecessitated to beforehand reserve a space in the casing 10 to move the cap member 28 of the housing 28 toward the rear direction of the housing 28. The overall apparatus can be therefore configured in a compact shape.

FIG. 5 shows an alternative embodiment of a camera according to the present invention. In this embodiment, a housing 28 containing a still camera unit is linked with a left end thereof to a casing 10 so as to be turned about a hinge 31 as a pivotal axis such that a right end thereof is apart from the casing 10. A film is located through an opening disposed in the bottom surface of the housing 28 by a drop-in loading.

Figure 6:
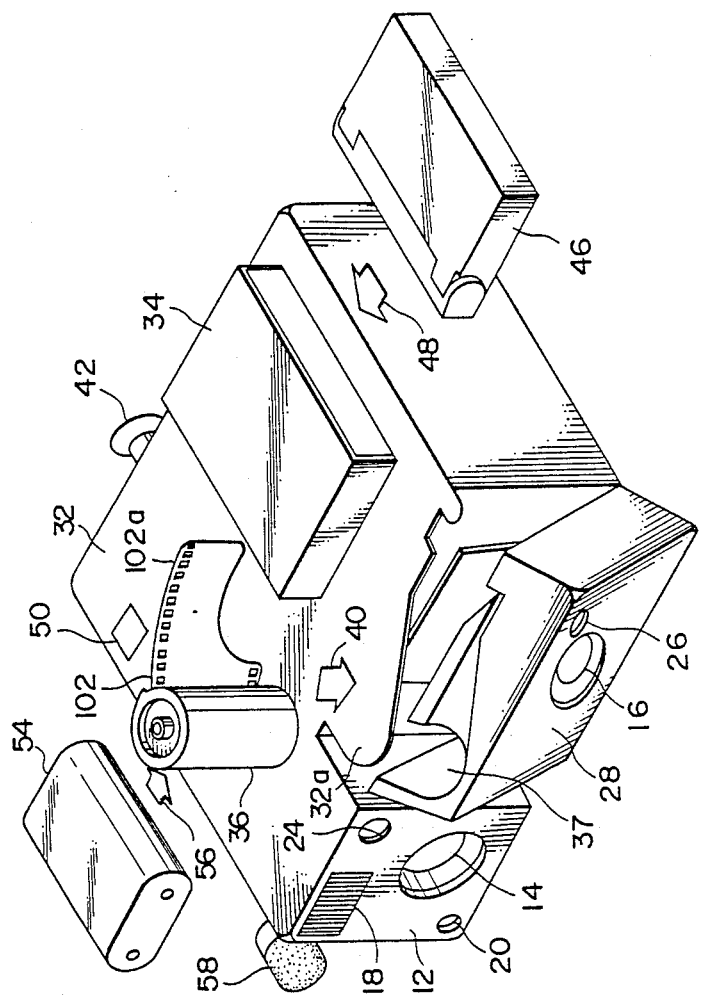
FIG. 6 is an outer perspective view useful to explain a state where films are loaded in further an alternative embodiment of a camera for shooting a movie picture and a still picture according to the present invention.

FIG. 6 shows a further alternative embodiment according to the present invention. In this embodiment, a housing 28 containing a still camera unit is linked with a left end thereof to a casing 10 so as to be turned for a release thereof about a hinge 31 as a pivotal axis such that a right end thereof is apart from the casing 10. A film is received through an opening disposed in the upper surface of the housing 28 into a film cartridge chamber 37 by a drop-in loading.

Also in the embodiments of FIGS. 5-6, the housing 28 is rotated with respect to the casing so as to open the cartridge chamber 37 of the housing 28. Consequently, since the cap member 32a of the housing 28 need not be released in the rear direction of the housing 28, the casing 10 can be configured in a compact shape.

Although the still camera unit of the embodiments above employs a silver-halide photographic film, the camera may be of an instant photograph type and of an electronic still camera type recording a video signal on a magnetic disk or in an IC memory.

As described above, according to the camera of the present invention, the casing contains the still camera unit and the video camera unit so that the same object scene can be shot by both units.

Furthermore, the still camera unit is located in a housing or a cabinet so as to be rotable with respect to the casing, which exposes the opening of the housing so as to enable a loading of a film; consequently, there is provided a camera for shooting a movie picture and a still picture which unnecessitates a space to be reserved to release a cap member of the housing toward the rear side of the housing.

While the present invention has been described with reference to the particular illustrative embodiments. it is not to be restricted by those embodiments but only by the appended claims. It is to be appreciated that those skilled in the art can change or modify the embodiments without departing from the scope and spirit of the present invention.

What is claimed is:

1. A camera for shooting a movie picture and a still picture comprising:
 a casing having generally a substantially rectangular parallelepiped shape;
 first imaging optical system means for shooting a still image and second imaging optical system means for shooting a video picture disposed in a front surface of said casing, said first and second imaging optical system means being directed to an object scene;
 still camera means disposed in said casing in the proximity of said first imaging optical system means for shooting the object scene to record a still picture thereof on a film; and
 video camera means disposed in said casing for shooting the object scene to record a movie picture thereof on a video tape;
 said first imaging optical system means and said still camera means being contained in a housing for said still camera means constituting a first portion of said casing;
 said housing of said still camera means having an opening formed in an upper surface or a bottom surface of said housing for loading the film by a drop-in loading operation and copping means for covering said opening;

said copping means being fixedly secured on said casing;

said housing for said still camera being linked with a means second excepts portion thereof to said casing such that said housing said copping means and is rotatable with respect to said casing so that said camera exposes said opening when said housing for said still camera means is rotated, thereby enabling the flim to be loaded.

2. A camera in accordance with claim 1, wherein said housing for said still camera means is linked with a left end or a right end thereof to said casing so as to be rotatable such that an end other than said linked end is apart from said casing.

3. A camera in accordance with claim 1, wherein said housing for said still camera means is linked with a bottom end thereof to said casing so as to be rotatable such that an upper end thereof is apart from said casing.

4. A camera in accordance with claim 1, wherein said video camera means further comprises:

video circuit means disposed on a rear side of said second imaging optical system means for shooting the object scene and generating a video signal representing a movie picture thereof; and video tape recording means arranged in said casing so as to be on a rear side of said still camera means for recording said video signal on a video tape;

said casing having an upper surface which has an opening formed thereon for loading a video tape cassette in said video tape recording means.

5. A camera in accordance with claim 1, wherein said casing is provided with a view finder directed to the object scene.

* * * * *